(12) United States Patent
DeKoning et al.

(10) Patent No.: US 6,895,485 B1
(45) Date of Patent: May 17, 2005

(54) CONFIGURING AND MONITORING DATA VOLUMES IN A CONSOLIDATED STORAGE ARRAY USING ONE STORAGE ARRAY TO CONFIGURE THE OTHER STORAGE ARRAYS

(75) Inventors: Rodney A. DeKoning, Augusta, KS (US); Charles D. Binford, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 456 days.

(21) Appl. No.: 09/732,003

(22) Filed: Dec. 7, 2000

(51) Int. Cl.[7] .............................................. G06F 12/00
(52) U.S. Cl. ....................... 711/170; 711/114; 718/105
(58) Field of Search .......................... 710/74; 711/170, 711/114, 111; 718/105

(56) References Cited

U.S. PATENT DOCUMENTS

| | | | | |
|---|---|---|---|---|
| 5,151,990 | A | * | 9/1992 | Allen et al. .................. 711/170 |
| 5,796,633 | A | * | 8/1998 | Burgess et al. .............. 702/187 |
| 5,897,661 | A | * | 4/1999 | Baranovsky et al. ........ 711/170 |
| 5,905,995 | A | * | 5/1999 | Tabuchi et al. .............. 711/114 |
| 6,145,066 | A | * | 11/2000 | Atkin .......................... 711/114 |
| 6,233,607 | B1 | * | 5/2001 | Taylor et al. ................ 709/217 |
| 6,314,503 | B1 | * | 11/2001 | D'Errico et al. ............. 711/165 |
| 6,330,621 | B1 | * | 12/2001 | Bakke et al. .................... 710/5 |
| 6,408,359 | B1 | * | 6/2002 | Ito et al. ...................... 711/114 |
| 6,446,161 | B1 | * | 9/2002 | Yamamoto et al. ......... 711/114 |
| 6,487,562 | B1 | * | 11/2002 | Mason et al. ............... 707/205 |
| 6,529,996 | B1 | * | 3/2003 | Nguyen et al. ............. 711/114 |
| 6,571,314 | B1 | * | 5/2003 | Komachiya et al. ........ 711/114 |
| 6,654,831 | B1 | * | 11/2003 | Otterness et al. ............. 710/74 |
| 2002/0004883 | A1 | * | 1/2002 | Nguyen et al. ............. 711/111 |

* cited by examiner

Primary Examiner—Matthew Anderson
Assistant Examiner—Shane Thomas
(74) Attorney, Agent, or Firm—Dan Fishman

(57) ABSTRACT

In a storage area network having a host device and a consolidated storage array (CSA), one of the storage arrays of the CSA acts as a primary device of the CSA to form logical data volumes across one or more of the total storage arrays of the CSA. The logical data volumes typically have performance requirements that cannot be met by a single storage array. Upon receipt of a command from the host device to create one of the logical data volumes, the CSA primary device analyzes the storage arrays to determine a combination thereof, across which the logical data volume will be striped, that best satisfies the performance requirements. The CSA primary device configures these storage arrays to form the logical data volume and sends striping information, which defines the logical data volume, to the host device. Striping software based on the host device responds to the striping information to access the logical data volume. The CSA primary device also manages the storage arrays and the logical data volume by monitoring the storage arrays to determine whether any of the storage arrays is about to reach its saturation point, typically due to changing performance requirements of all of the logical data volumes on the storage arrays. The CSA primary device then migrates a portion of one of the logical data volumes from one storage array to another to balance the data transfer loads on the storage arrays.

10 Claims, 4 Drawing Sheets

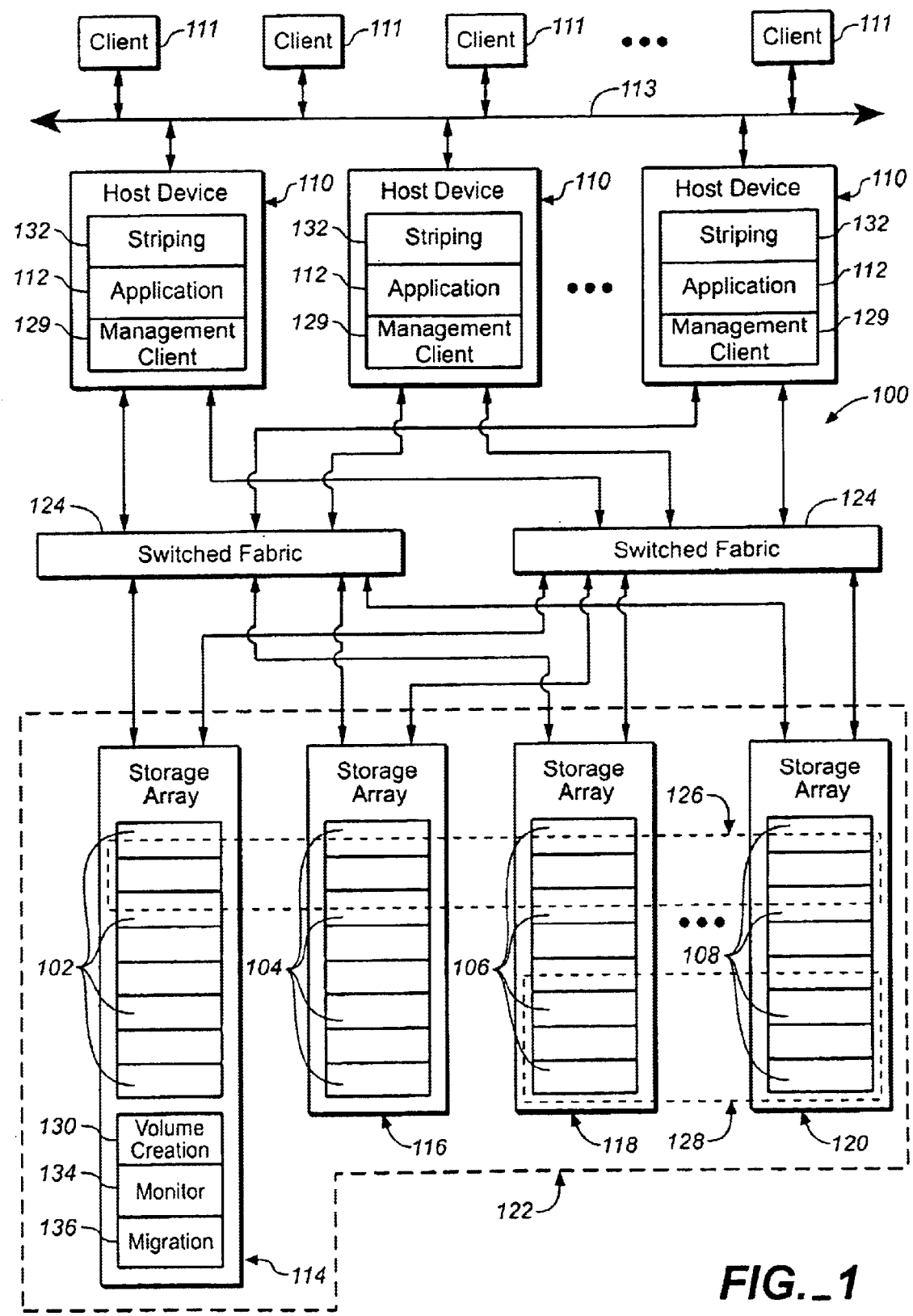
FIG._1

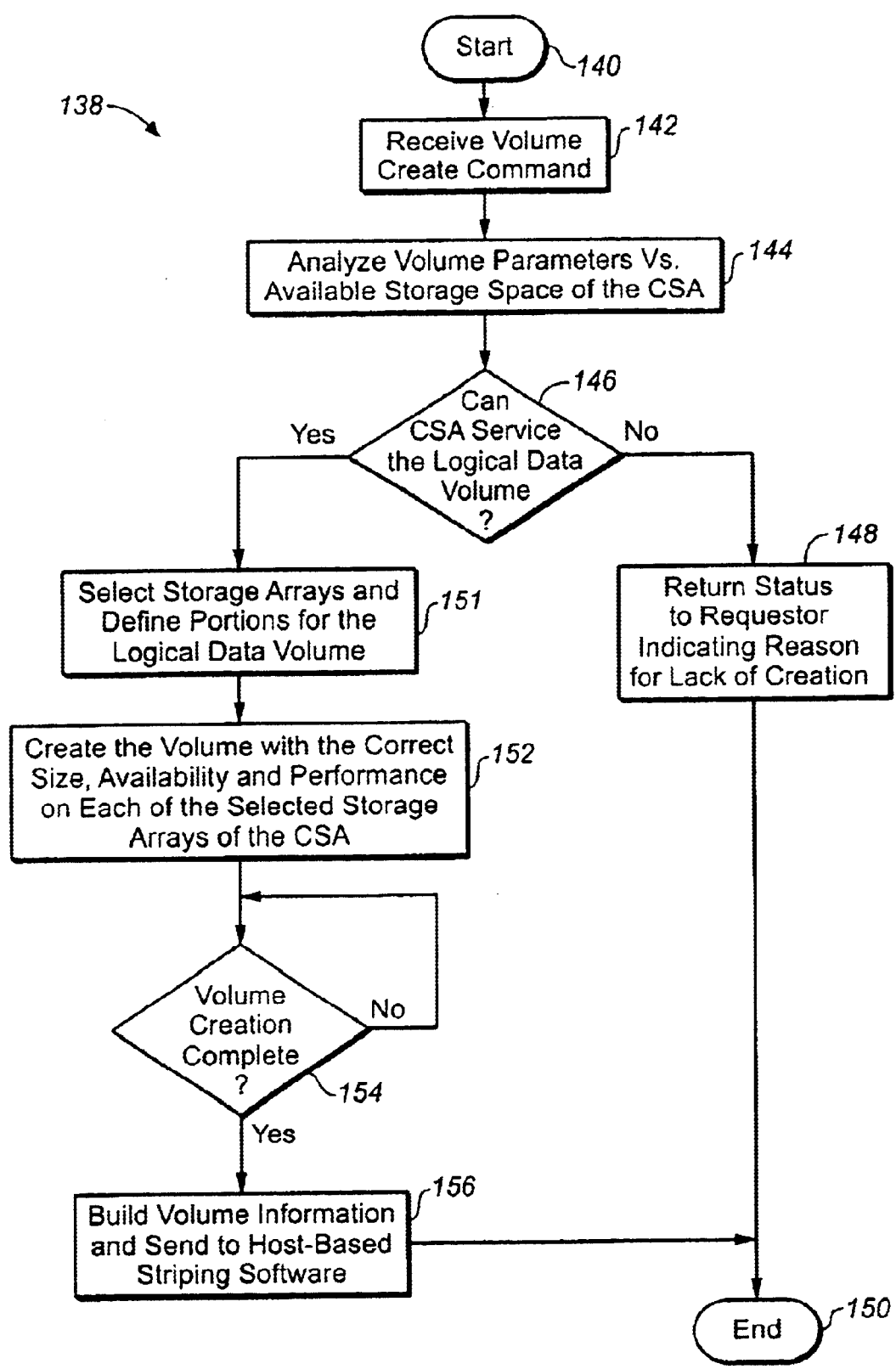
FIG._2

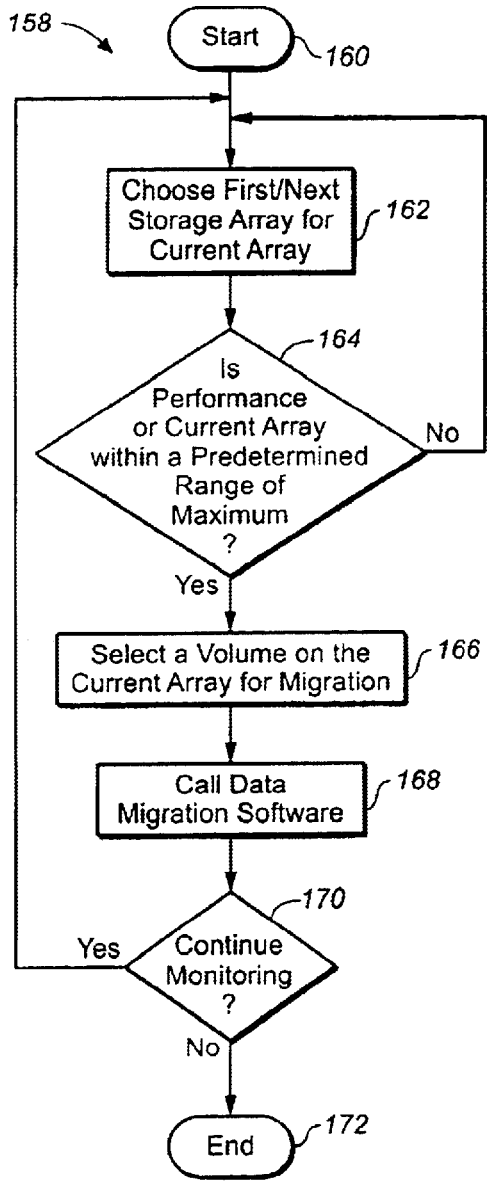
FIG._3
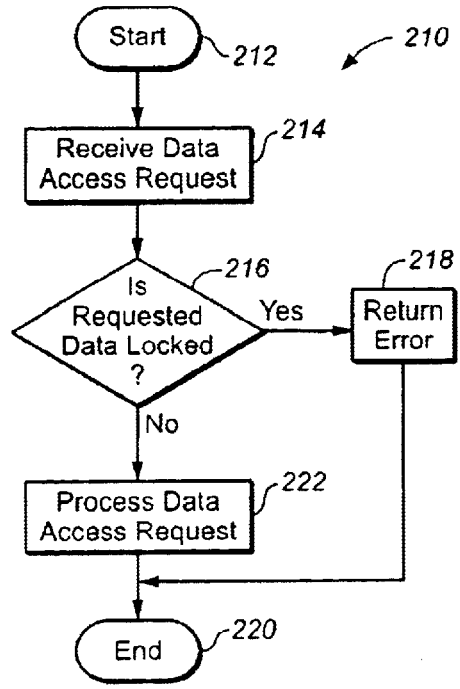
FIG._6

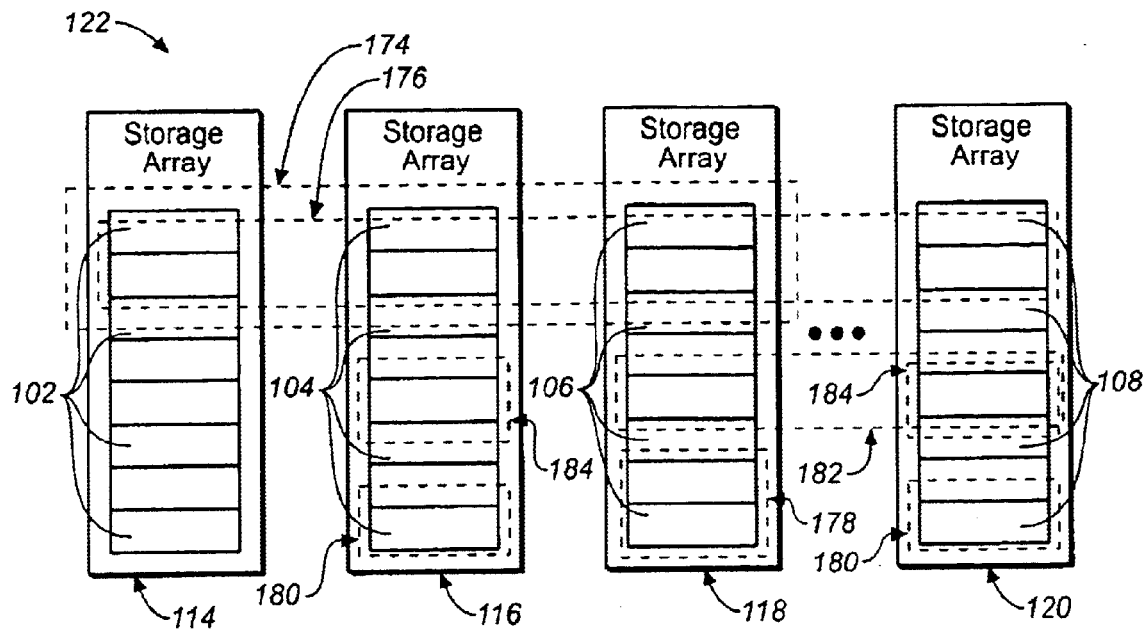
FIG._4
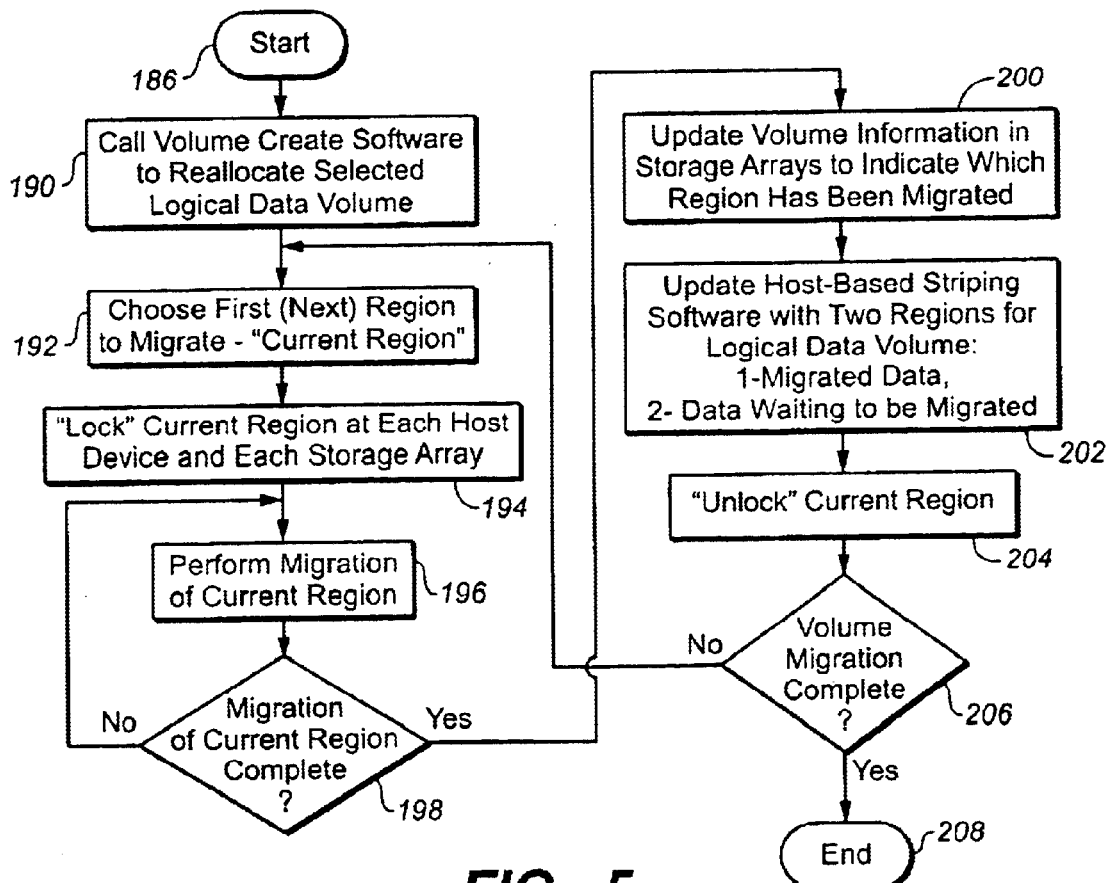
FIG._5

CONFIGURING AND MONITORING DATA VOLUMES IN A CONSOLIDATED STORAGE ARRAY USING ONE STORAGE ARRAY TO CONFIGURE THE OTHER STORAGE ARRAYS

FIELD OF THE INVENTION

This invention relates to apparatus and methods for data storage in a computerized network or system utilizing a consolidated storage array. More particularly, the present invention relates to configuring, monitoring and managing logical data volumes across multiple storage arrays in the consolidated storage array. One of the storage arrays is designated as a primary storage array, which allocates and configures and then monitors and manages the logical data volumes according to specified requirements of host devices that use the logical data volumes.

BACKGROUND OF THE INVENTION

Individual storage devices are used to store data and typically include hard drives, compact disk (CD) drives, tape drives and others. Some of these types of storage devices, particularly hard drives, are commonly grouped together in a storage array. A storage array is a group of storage devices, typically two to eight, that function cooperatively together, such as in a RAID (Redundant Array of Independent Drives) configuration. Typically, the storage devices in the storage array are installed together in a single unit, such as a storage server or "storage box." The storage array has greater storage capacity and data transfer speed than does an individual storage device, so the storage array can service software applications that have greater storage requirements than can the individual storage device.

Individual storage arrays, however, do not have the high bandwidth and transaction rates required by some current high-capacity software applications. "Bandwidth" typically refers to the total amount of data that can be transferred into or out of the storage array per unit of time. "Transaction rate," however, typically refers to the total number of separate data accesses or I/O (Input/Output) requests that can be serviced by the storage array per unit of time. A single storage device has a bandwidth and transaction rate capacity that is insufficient for many modern software applications. By combining more than one storage device into the storage array, the storage devices can be accessed in parallel for a much greater overall bandwidth and transaction rate. Thus, a volume of data (e.g. a file or database) within the storage array is divided into multiple sections, which are each stored on different storage devices within the storage array, so the data on each storage device can be accessed simultaneously (i.e. in parallel) with each other. However, some current high-capacity software applications have such high bandwidth and/or transaction rate requirements that even the storage array cannot satisfy them.

For the current high-capacity software applications, multiple storage arrays are combined into a consolidated storage array (CSA), so that the storage arrays within the CSA can be accessed in parallel with each other for a much greater overall bandwidth and transaction rate than is possible with a single storage array. Thus, the data volume is divided up and allocated to more than one of the storage arrays of the CSA to achieve the desired bandwidth and transaction rates for access to the data volume. Typically, the data volume is established with data striping and redundancy techniques to ensure against loss of the data. Additionally, the CSA is connected through a communication network, such as a switched fabric, to one or more host devices that execute the high-capacity software applications. The communication network has a communication rate that is high enough to satisfy multiple applications executing on the host devices by accessing multiple data volumes on the CSA simultaneously without loss of performance.

When using such high-capacity software applications, the user (e.g. the person using the high-capacity software application) must create the data volume within the CSA and supply a definition of the data volume to the host device. Striping software executing on the host device must be configured with the identification of the storage arrays across which the data volume is striped and the definition of the data volume. The procedure for creating such a data volume striped across multiple devices is very time-consuming and prone to human error, due to the amount of human interaction required.

To create the data volume within the CSA, the user must determine the parameters necessary for the desired data volume according to the needs of the high-capacity software application. Such parameters typically include size, bandwidth, transaction rate, redundancy and other attributes. The user must then analyze the storage arrays of the CSA to determine which storage arrays are available, the amount of unused storage space on the available storage arrays, the current bandwidth usage of other applications that access existing data volumes on the storage arrays, and the remaining bandwidth capacity. Since usually not all of the storage arrays of the CSA are utilized in exactly the same manner, the user must manually add up the storage space, bandwidth and transaction rate capacities for the available storage arrays to determine which ones of the storage arrays can be grouped together to form the data volume with the required parameters. The user must also typically take into consideration a balancing of the data access loads on each of the storage arrays. Once the host device and each of the storage arrays has been properly configured with the definition for the data volume, the host device may begin accessing the data volume. Additionally, if more than one host device will be executing an application that requires access to the same data volume, then the user must configure the striping software of each host device with the definition of the data volume.

The user may intentionally overestimate the necessary parameters for the data volume in order to account for errors in the analysis of the available storage arrays and to reduce the need to make future changes to the data volume as usage of the storage arrays by any other applications executing on the host devices also changes. Such errors may occur since the other applications utilizing the same storage arrays may not always access the data volumes stored thereon to the fullest extent anticipated when the data volumes were created. Thus, the user may get a false view of the available bandwidth or transaction rate capacity of some of the storage arrays. Subsequently, when performance of the applications and usage of the data volumes are at a peak, unacceptable degradation of the performance of the applications may occur.

Additionally, some of the other applications utilizing the same storage arrays may change the usage of their existing data volumes in the CSA, and newly executed applications may be started on the host devices with new data volumes created in the CSA. As a result, overall usage of the storage arrays can change suddenly. The user must, therefore, be aware of whether any of the storage arrays are nearing or have surpassed their maximum capacity. In this case, the user may have to change the combination of storage arrays on which the data volume resides. Therefore, after creating the data volume, the user must continuously monitor the performance of the CSA to ensure that the storage arrays are servicing the application according to the required parameters for data access. Before changing the combination of storage arrays for the data volume, however, the user must repeat the time-consuming analysis of the CSA to determine which storage arrays are available and which combination of storage arrays will safely meet the necessary parameters. Then, when a new combination of storage arrays has been chosen, the user must carefully orchestrate the transfer of affected portions of the data volume (preferably during off-peak times) to avoid undesirable effects on the performance of the application. Additionally, if more than one host device is executing an application that needs to access the changed data volume, then the user must reconfigure the striping software of each of these host devices with the new definition of the data volume to be able to access the correct storage arrays for the data volume.

It is with respect to these and other background considerations that the present invention has evolved.

SUMMARY OF THE INVENTION

The present invention relieves the user from much of the burden for configuring, monitoring and managing storage arrays used to form a logical data volume in a storage area network (SAN). A logical data volume is generally a file or database that is physically located in one or more of the storage arrays, but is logically defined for the application utilizing the logical data volume as a single volume. A consolidated storage array (CSA) is formed from the storage arrays in which one of the storage arrays is selected as a "primary" or "master" CSA device through which the entire CSA is presented to users as a single device on which the logical data volume is formed.

The user, through a host device, issues a command to the CSA to create the logical data volume. The volume create command includes parameters (e.g. size, bandwidth, transfer speed, transaction rate, redundancy and other attributes) that describe the characteristics of the requested logical data volume. The CSA primary device receives the volume create command and queries the individual storage arrays in the CSA to analyze the CSA to determine which combination of the individual storage arrays will best satisfy the required parameters for the logical data volume. The combination that best satisfies the required parameters balances the total data transfer load of the storage arrays in light of required parameters of any existing logical data volumes in the CSA plus the required parameters of the new logical data volume. The CSA primary device then selects the storage arrays and creates the logical data volume across the selected storage arrays by configuring each of the selected storage arrays for a portion of the logical data volume. The logical data volume is, thus, formed across a number of the storage arrays. The CSA primary device then passes volume information to striping software executing on the host device to configure the host device to use the logical data volume. The volume information describes or defines the logical data volume, including the order and location of the selected storage arrays and the portions thereof across which the logical data volume has been formed. The host device may then begin to access the logical data volume. Additionally, if more than one host device requires access to the logical data volume, then the CSA primary device passes the volume information to each of the host devices.

The CSA primary device, rather than the user, monitors the performance of each of the storage arrays to determine whether any of the storage arrays is nearing or has surpassed its maximum capacity and cannot support the required parameters for the logical data volume. If so, the CSA primary device automatically re-analyzes the storage arrays to determine a new combination of the storage arrays that will satisfy the required parameters for the logical data volume. The CSA primary device, transparent to the user, then schedules the transfer of any affected portions of the logical data volume to a different storage array in a manner so as not to disrupt the normal operation of the application on the host device. New volume information is then passed from the CSA primary device to the host device to reconfigure the striping software to use the changed logical data volume.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a storage area network (SAN) incorporating the present invention.

FIG. 2 is a flowchart of a procedure to create a logical data volume in a consolidated storage array (CSA) incorporated in the SAN shown in FIG. 1.

FIG. 3 is a flowchart of a procedure to monitor performance of individual storage arrays in the CSA incorporated in the SAN shown in FIG. 1.

FIG. 4 is a block diagram of the SAN shown in FIG. 1 illustrating migration of a data volume between individual storage arrays.

FIG. 5 is a flowchart of a procedure to migrate at least a portion of a data volume between storage arrays in the SAN shown in FIG. 5.

FIG. 6 is a flowchart of a procedure to respond to data access requests during migration of the data volume pursuant to the procedure shown in FIG. 5.

DETAILED DESCRIPTION

A storage area network (SAN) 100, as shown in FIG. 1, generally includes several conventional storage devices 102, 104, 106 and 108 that are accessed by one or more conventional host devices 110, typically on behalf of one or more conventional client devices 111 or applications 112 running on the host devices 110. The SAN 100 also typically services the computer storage needs of a business or enterprise (not shown) wherein many of the enterprise's computers (e.g. the client devices 111) are networked together. Each host device 110 is connected to one or more of the client devices 111 by a conventional communication link 113, such as a local area network (LAN). The storage devices 102, 104, 106 and 108 (e.g. hard drives) are incorporated in conventional high-volume, high-bandwidth storage arrays 114, 116, 118 and 120, which in turn form a consolidated storage array (CSA) 122. Conventional switched fabrics 124 connect each of the host devices 110 to each of the storage arrays 114, 116, 118 and 120. In this case, the presence of two switched fabrics 124 enables redundant data transfer paths between each of the host devices 110 and each of the storage arrays 114, 116, 118 and 120.

Storage space in the storage devices 102, 104, 106 and 108 within the storage arrays 114, 116, 118 and 120 is configured into logical data volumes 126 and 128, for example. The CSA 122 enables storage management in an enterprise or business (not shown) using a single primary device to consolidate the management and monitoring of all or portions of the storage space in the CSA 122. The primary device of the CSA 122 is preferably one of the storage arrays 114, 116, 118 or 120 (e.g. storage array 114). The functions of the CSA primary device may also be taken over by one of the other storage arrays 116, 118 or 120 in the event of a failure of the CSA primary device, e.g. storage array 114. The CSA primary storage array 114 presents the CSA 122 to the host devices 110 as a single device through a set of application program interfaces (API's)(not shown).

The storage array 114, as the CSA primary device, is responsible for taking requests from the host devices 110 for the creation and manipulation of the logical data volumes 126 and 128 in the CSA 122, so as to configure the storage space in the CSA 122 without further interaction from the host devices 110. The CSA primary storage array 114 also monitors the storage arrays 114 to 120 and supplies a consolidated view of the storage arrays 114 to 120 to users (e.g. persons using the client devices 111 or the applications 112) of the logical data volumes 126 and 128. The consolidated view of the storage arrays 114 to 120 allows the user to view the storage arrays 114 to 120 as a single storage array (e.g. the CSA 122) and not be concerned with the actual physical components of the CSA 122. The CSA primary storage array 114 also performs data "migration," or transfer of portions of the logical data volumes 126 and 128, in order to balance the data transfer loads of each of the storage arrays 114 to 120 within the CSA 122. The monitoring and migrating functions enable management and optimization of the logical data volumes 126 and 128 transparent from, or without interaction by, the user.

The logical data volumes 126 and 128 are typically striped across more than one of the storage arrays 114, 116, 118 and 120 using conventional data striping techniques, but may also be fully contained in just one of the storage arrays 114, 116, 118 and 120. For example, logical data volume 126 includes storage space in storage devices 102, 104, 106 and 108 in each of the storage arrays 114, 116, 118 and 120, but logical data volume 128 includes storage space only in storage devices 106 and 108 in the storage arrays 118 and 120. Thus, multiple devices (the storage arrays 114 to 120) that are incapable of satisfying the data storage requirements of the client devices 111 or applications 112 are grouped into a single "logical" device (the logical data volume 126 or 128) that is capable of satisfying the requirements specified by the user.

The host devices 110 write and read data to and from the logical data volumes 126 and 128 to which they have been granted access by the CSA. Each logical data volume 126 and 128 has one or more host device 110 which can access it.

When one of the host devices 110 requires a new logical data volume 126 or 128, the user of the host device 110, through a management client software 129 executing on the host device 110 that interacts with the API's (not shown) on the CSA primary storage array 114, issues a command to the CSA primary storage array 114 to create a logical data volume in the CSA 122. The user specifies the performance parameters (e.g. size, bandwidth, etc.) for the new logical data volume 126 or 128 by entering the parameters into the management client software 129. The management client software 129 then includes the specified parameters in the command sent to the CSA primary storage array 114. Thus, the user does not have to manually determine the best configuration for the new logical data volume 126 or 128 and then configure the storage arrays 114 to 120, but only specifies the desired performance parameters.

The CSA primary storage array 114 includes volume creation software 130, which performs the steps necessary to create the logical data volumes, e.g. logical data volumes 126 and 128, in response to the volume create commands received from the host devices 110. The volume creation software 130 also performs the steps necessary to configure the storage arrays 114 to 120 and the host devices 110 to be able to use the logical data volumes 126 and 128. Additionally, when one of the host devices 110, or the user thereof, requires a change to an existing logical data volume 126 or 128, the host device 110 sends another volume create command to the CSA primary storage array 114, and the volume creation software 130 makes the change.

As stated, the volume create command includes various performance parameters that define the logical data volume 126 or 128 to be created. For example, the volume create command specifies the size or the number of bytes required for the logical data volume 126 or 128. The volume create command may also specify the bandwidth, transfer speed or bytes per second, at which the application 112 executing on the host device 110 needs to communicate data with the logical data volume 126 or 128. Relatively large individual I/O's involved in "video streaming" is an example of a situation with a large bandwidth speed requirement. The volume create command may also specify the transaction rate (i.e. transactions per second) at which the application 112 requires sustained data communication with the logical data volume 126 or 128. Many individual transactions involved in "banking transactions" is an example of a situation with a high transaction rate requirement. The volume create command may also specify other attributes, such as a desired redundancy for the data in the logical data volume 126 or 128 to ensure against loss of the data.

The volume creation software 130 analyzes the storage arrays 114 to 120 in light of the desired parameters for the logical data volume to be created and the requirements of any existing logical data volumes. The volume creation software 130 acquires performance parameters that were specified for all other logical data volumes 126 and 128 already present on the CSA 122. The volume creation software 130 then compares the remaining available performance capabilities of the storage arrays 114 to 120 with the desired parameters for the new logical data volume 126 or 128. The available performance capabilities of the storage arrays 114 to 120 may be determined from conventional statistics maintained by conventional controllers (not shown) of the storage arrays 114 to 120 and made available through conventional API's (not shown) to the CSA primary storage array 114.

The volume creation software 130, thus, determines a combination of all or some of the storage arrays 114 to 120 across which the logical data volume 126 or 128 can be striped or allocated for the CSA 122 to meet the desired parameters. The volume creation software 130 locates and adds up the available storage space in the storage arrays 114 to 120 to make sure that there is sufficient available storage space for the desired logical data volume 126 or 128. Even if one of the storage arrays 114 to 120 has sufficient available storage space to contain the entire logical data volume 126 or 128, if a single storage array 114, 116, 118 or 120 cannot meet the bandwidth or transaction rate requirements, then the volume creation software 130 will allocate space for the logical data volume 126 or 128 across enough of the storage arrays 114 to 120 for the combined bandwidth or transaction rate to meet or exceed the requirements. The allocation of the storage space across the storage arrays 114 to 120 may be made through conventional "best fit" or "first fit" algorithms that take into consideration the desired parameters.

After the volume creation software 130 has determined whether the CSA 122 can support the logical data volume 126 or 128 and selected the necessary ones of the storage arrays 114 to 120 and the storage space therein to form the logical data volume 126 or 128, the volume creation software 130 configures each of the selected storage arrays 114, 116, 118 and/or 120 for the logical data volume 126 or 128 through interaction with conventional API's (not shown). Thus, each selected storage array 114, 116, 118 and/or 120 may contain a portion of the logical data volume 126 or 128.

The volume creation software 130 then passes metadata or volume information that defines or describes the logical data volume 126 or 128, particularly indicating the order and location of each portion of the logical data volume 126 or 128, to the host device 110 that needs to access the logical data volume 126 or 128. The volume information includes a conventional striping definition for the new logical data volume 126 or 128, the identification of the logical units that make up the new logical data volume 126 or 128, the location of the logical units, the conventional unique name for each storage array 114 to 120, etc. In particular, the volume information preferably includes a tuple that identifies a storage array identification (ID), a target ID(s) and a volume ID(s) for each portion of the storage arrays 114 to 120 that are used to form the logical data volume 126 or 128. Alternatively, only a CSA volume ID, identifying a name for the logical data volume 126 or 128 that is unique throughout the SAN 100, may be supplied to the host devices 110.

Striping software 132 executing on the host device 110 is configured with the volume information to be able to access the logical data volume 126 or 128. If more than one host device 110 requires access to the logical data volume 126 or 128 then the striping software 132 executing on each such host device 110 is configured with the volume information to be able to access the logical data volume 126 or 128. The host device 110 is then free to use the logical data volume 126 or 128 in a conventional manner.

The volume creation software 130 may also return a status indicator to the host device 110 indicating that the requested logical data volume has been created and is ready for access. The host device 110 then scans the CSA 122 until the host device 110 finds the newly created storage space. The host-based striping software 132 then queries the CSA primary storage array 114 to determine the proper striped logical data volume 126 or 128 to be used.

The CSA primary storage array 114 also includes monitoring software 134 to monitor, without user interaction, the performance of each of the storage arrays 114 to 120. In order to monitor such performance, the monitoring software 134 maintains the parameters that were provided to the volume creation software 130 in the volume create command for each of the logical data volumes 126 and 128. After the creation of the logical data volumes 126 and 128, the monitoring software 134 determines the ongoing actual performance of the storage arrays 114 to 120 by querying the conventional API's on the storage arrays 114 to 120 through which conventional statistics are kept of the actual performance of the storage arrays 114 to 120. The monitoring software 134 then compares the actual performance of the storage arrays 114 to 120 with the original performance requirements for each of the logical data volumes 126 and 128. In this manner, the monitoring software 134 determines whether the CSA 122 continues to be able to support the performance parameters (e.g. bandwidth and/or transaction rate) of the logical data volumes 126 or 120.

If one or more of the storage arrays 114 to 120 is nearing or has reached its maximum capability for data transfers (i.e. is becoming "maximized" or "saturated"), then the CSA primary storage array 114 must change the distribution of at least one of the logical data volumes 126 and 128 across the GSA 122 to reduce the data transfer load on the maximized storage array 114, 116, 118 or 120. The CSA primary storage array 114 typically discovers the logical data volume 126 or 128 with the worst relative fit in the storage arrays 114 to 120 given the desired performance parameters of the logical data volumes 126 and 128 and the actual performance capabilities of the storage arrays 114 to 120 and selects this logical data volume 126 or 128 to be migrated. The CSA primary storage array 114 also typically alerts a conventional array management software on the host devices 110 of the need to migrate, or the pending migration of, the selected logical data volume 126 or 128.

To change the distribution of the selected logical data volume 126 or 128, the volume creation software 130 re-analyzes the performance and available space of the storage arrays 114 to 120 in light of the original performance requirements for the logical data volume 126 or 128. The volume creation software 130 thereby determines a new "best fit" combination of the storage devices 102 to 108 in the storage arrays 114 to 120 for the selected logical data volume 126 or 128, preferably with the least amount of changes. The monitoring software 134 and/or the volume creation software 130 may also alert the user with a warning message when new storage arrays, switched fabrics or other equipment need to be added to the SAN 100 to continue to meet the requirements being placed on the overall storage.

After the new combination of the storage devices 102 to 108 has been determined, the CSA primary storage array 114 schedules the migration of the affected portion(s) of the logical data volume 126 or 128 using data migration software 136, or conventional RAID (Redundant Array of Independent Drives) migration functionality. The data migration software 136 schedules, or paces, the migration of the data for time periods when the affected logical data volume 126 or 128 is not being used very heavily by the client device 111 or the application 112. The data migration software 136 schedules and performs the migration of the data automatically, so the user does not have to be involved in this task. Thus, the data migration task can be performed more efficiently and the effect of any degradation in the performance of the client device 111 or the application 112, due to temporary unavailability of portions of the logical data volume 126 or 128, will be minimized. The data migration software 136 then updates the host-based striping software 132 by sending new metadata or volume information to the host-base striping software 132.

In addition to the automatic monitoring performed by the monitoring software 134, the CSA primary storage array 114 also responds to requests for monitoring the CSA 122 sent by the user through one of the host devices 110. When the CSA primary storage array 114 receives the request for monitoring the CSA 122, the CSA primary storage array 114 gathers the physical and logical configuration and status information for all of the storage arrays 114 to 120 in the CSA 122 and sends back a reply. The reply includes all the configuration and status information for all the physical storage in the CSA 122. This information is then presented to the user for viewing the total configuration and usage of the CSA 122 on a computer display (not shown).

A process 138 to create a logical data volume 126 or 128 in the CSA 122 under control of the volume creation software 130 is shown in FIG. 2. The process 138 begins at step 140. At step 142, a volume create command is received by the CSA primary storage array 114. At step 144, the parameters that define the requested logical data volume are extracted from the volume create command and analyzed with respect to available storage space in the storage devices 102 to 108 (FIG. 1) in the storage arrays 114 to 120 (FIG. 1) of the CSA 122 (FIG. 1). At step 146, it is determined whether the CSA 122 can service the requirements of the requested logical data volume. If not, then at step 148, the volume creation software 130 returns status information to the host device 110 (FIG. 1) that sent the volume create command indicating the reason why the logical data volume was not created. Afterwards, the process 138 ends at step 150.

If the determination at step 146 was positive, indicating that the CSA 122 can service the requirements of the requested logical data volume, then at step 151, the process 138 selects from the storage arrays 114 to 120 and defines portions thereof that will form the requested logical data volume. At step 152, the logical data volume is created with the correct size, availability and performance parameters on each of the selected storage arrays 114 to 120 of the CSA 122. At step 154, the process 138 waits in a loop until the logical data volume has been fully created. At step 156, the volume information that defines the logical data volume is formed and passed to each of the host devices 110 that requires access to the created logical data volume. The process 138 ends at step 150. Afterwards, the application 112 (FIG. 1) executing on the host device 110 may proceed to access the created logical data volume.

After the CSA primary storage array 114 (FIG. 1) has created one or more logical data volumes 126 and/or 128 (FIG. 1), the CSA primary storage array 114 monitors the performance of the storage arrays 114 to 120 (FIG. 1) of the CSA 122 (FIG. 1) according to a monitoring procedure 158, as shown in FIG. 3, under the control of the monitoring software 134 (FIG. 1). The procedure 158 begins at step 160. At step 162, the first storage array 114 to 120 (or next storage array for subsequent passes through the procedure 158) is selected for monitoring and is designated as the "current array."

At step 164, it is determined, as described above, whether the performance of the current array is within a predetermined range of a maximum performance capability for the current array, i.e. whether the current array is nearing or has reached the point at which its performance becomes saturated, such that the performance of portions of the logical data volumes 126 and/or 128 stored thereon will begin or have begun to degrade. If the performance of the current array is not within the predetermined range of the maximum performance capability, then the current array does not need to be changed, so the procedure 158 branches back to step 162 to continue with monitoring the next storage array 114 to 120.

If the determination at step 164 is positive, then the current array needs to be changed to reduce its data transfer load to improve its performance or prevent it from becoming saturated. Therefore, at step 166, one of the logical data volumes 126 or 128, which has a portion formed by the current array, is selected to have the entire portion or a subportion thereof migrated to a different storage array 114, 116, 118 or 120. At step 168, the data migration software 136 (FIG. 1) is called, and the selected logical data volume 126 or 128 is passed to the data migration software 136. At step 170, it is determined whether the monitoring of the CSA 122 is to continue. If so, then the procedure 158 branches back to step 162 to continue the monitoring with the next storage array 114, 116, 118 or 120. Otherwise, if the monitoring is not to be continued at step 170, indicating that the user has canceled further monitoring, then the procedure 158 ends at step 172.

Three different exemplary situations in which logical data volumes are migrated in the CSA 122 (see also FIG. 1) are illustrated in FIG. 4, wherein logical data volume 174 is migrated to logical data volume 176, logical data volume 178 is migrated to logical data volume 180, and logical data volume 182 is migrated to logical data volume 184. Initially, logical data volume 174 is striped across some of the storage devices 102, 104 and 106 in the storage arrays 114, 116 and 118, logical data volume 178 is contained entirely within the storage devices 106 in the storage array 118, and logical data volume 182 is striped across some of the storage devices 106 and 108 in the storage arrays 118 and 120. In each example, the monitoring software 134 (FIG. 1) performing the monitoring procedure 158 (FIG. 3) has detected that storage array 118 is nearing its maximum performance capacity, so the data transfer load thereon must be reduced.

In the first example, the logical data volume 174 has been selected to be migrated. The data migration software 136 (FIG. 1) calls the volume creation software 130 (FIG. 1) to determine a new combination of storage space in the storage devices 102 to 108 of the storage arrays 114 to 120 for logical data volume 174 that will best fit, or evenly distribute, the current data transfer loads of the storage arrays 114 to 120. In light of the original parameters for the logical data volume 174, the volume creation software 130 determines that the logical data volume 174 can be reallocated as logical data volume 176, which takes up less storage space on the storage arrays 114, 116 and 118, but is spread to the additional storage array 120. Thus, a portion of the data stored on each of the storage arrays 114, 116 and 118 is migrated to the storage array 120. In this manner, the data transfer load on storage array 118 is lessened.

In the second example, the logical data volume 178 has been selected to be migrated. The data migration software 136 (FIG. 1) calls the volume creation software 130 (FIG. 1) to determine a new combination of storage space in the storage devices 102 to 108 of the storage arrays 114 to 120 for logical data volume 178 that will best fit the current data transfer loads of the storage arrays 114 to 120. In light of the original parameters for the logical data volume 178, the volume creation software 130 determines that the logical data volume 178 can be reallocated as logical data volume 180, which takes up no storage space on the storage array 118, but is striped across the storage arrays 116 and 120. Thus, a portion of the data stored on the storage array 118 is migrated to the storage array 116 and the remainder of the data stored on the storage array 118 is migrated to the storage array 120. In this manner, the data transfer load on storage array 118 is lessened.

In the third example, the logical data volume 182 has been selected to be migrated. The data migration software 136 (FIG. 1) calls the volume creation software 130 (FIG. 1) to determine a new combination of storage space in the storage devices 102 to 108 of the storage arrays 114 to 120 for logical data volume 182 that will best fit the current data transfer loads of the storage arrays 114 to 120. In light of the original parameters for the logical data volume 182, the volume creation software 130 determines that the logical data volume 182 can be reallocated as logical data volume 184, which takes up no storage space on the storage array 118, but is striped across the storage arrays 116 and 120. Thus, the entire portion of the logical data volume 182 stored on the storage array 118 is migrated to the storage array 116, while the portion of the logical data volume 182 stored on the storage array 120 remains on the storage array 120. In this manner, the data transfer load on storage array 118 is lessened.

After the monitoring procedure 158 (FIG. 3) calls the data migration software 136 (FIG. 1) at step 168 (FIG. 3), a data migration procedure 186, as shown in FIG. 5, determines which portion(s) of the selected logical data volume (e.g. logical data volume 174 shown in FIG. 4) to migrate and performs the migration under the control of the data migration software 136. The procedure 186 begins at step 188. At step 190, the volume creation software 130 (FIG. 1) is called to create the new logical data volume 176 (FIG. 4) for the selected logical data volume 174. Preferably, the volume creation software 130 uses the current definition of the selected logical data volume 174 as a starting point and makes as few changes in the definition as are necessary for the new logical data volume 176 to fit within the original parameters for the selected logical data volume 174. In this manner, the smallest amount of data will have to be migrated, so the migration can occur as quickly as possible, and the applications 112 (FIG. 1) will experience the least disruption of performance. Alternatively, if the disruption of the applications 112 will not be significant, the volume creation software 130 determines the "best fit," or even distribution, for the new logical data volume 176 in the CSA 122 (FIGS. 1 and 4), without regard to minimizing the amount of data to be migrated.

At step 192, the first region (or the next region for subsequent passes through this procedure 186) containing data that is affected by the migration of the selected logical data volume 174 is designated as the "current region." Each region is preferably a portion of the storage space in the storage devices 102 to 108 that can be rapidly transferred to a new location, such as multiples of a conventional striping unit. At step 194, the current region is "locked" at each host device 110 (FIG. 1) and at each storage array 114 to 120, so that the current region cannot be accessed during the migration thereof. At step 196, the migration of the current region begins by reading the current region from its old location in the selected logical data volume 174 and writing the current region to its new location in the new logical data volume 176. At step 198, the procedure 186 checks whether the migration of the current region is complete. If not, the procedure 186 branches back to step 196 to continue the migration of the current region.

When the migration of the current region is completed, then at step 200, the volume information in the affected storage arrays 114, 116, 118 and/or 120 (FIGS. 1 and 4) that defines, or describes, the new logical data volume 176 (FIG. 4) is updated to indicate which region has been migrated. At step 202, the host-based striping software 132 (FIG. 1) for each of the affected host devices 110 is also reconfigured with the updated volume information for two types of regions for the selected and new logical data volumes 174 and 176: one type of region containing migrated data, and the other type of region containing data waiting to be migrated. After the current region has been fully migrated, there will be no regions containing data waiting to be migrated. At step 204, the current region is unlocked at each host device 110 and at each storage array 114 to 120, so that the current region may again be accessed.

At step 206, it is determined whether the migration of the affected portions of the selected logical data volume 174 has been completed. If not, then the procedure 186 branches back to step 192 to continue the migration with the next region. If the determination at step 206 is positive, however, indicating that the migration in complete, then the procedure 186 ends at step 208.

During the migration procedure 186 (FIG. 5), when the affected storage array 114, 116, 118 or 120 (FIGS. 1 and 4) receives a request to access data, the affected storage array 114, 116, 118 or 120 responds according to a procedure 210, as shown in FIG. 6. The procedure 210 begins at step 212. At step 214, the storage array 114, 116, 118 or 120 receives a data access request from one of the host devices 110 (FIG. 1). At step 216, it is determined whether the requested data has been "locked" in the "current region," as described above at step 194 (FIG. 5) of the data migration procedure 186 (FIG. 5). If so, then at step 218, the procedure 210 returns an error signal to the host device 110 that sent the data access request. Preferably, the error signal indicates to the host device 110 to retry the data access request after a period of time, since the current region will soon be "unlocked" and accessible again. The procedure 210 ends at step 220. If the determination at step 216 was negative, however, indicating that the requested data is not locked, then at step 222, the data access request is processed in a normal manner, and the procedure 210 ends at step 220.

As has been described above, the present invention groups multiple lower-performing storage arrays into higher-performing logical data volumes, so that the logical data volumes are not limited by the bandwidth or transaction rates of the individual storage arrays. The present invention also configures and monitors the multiple storage arrays through a single storage array as a primary device of the CSA in a manner making the monitoring transparent to, and not requiring interaction by the user, so the user does not have to manually perform these tasks. Thus, the management of the storage arrays is more efficient and less time-consuming, since the user has to interact with only one device, which then manages all of the other storage arrays. Not only does the invention enable simplified configuration of the storage arrays, but the invention also enables automatic optimization through monitoring performance of the storage arrays and migrating data when necessary to balance the data transfer loads between each of the storage arrays.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of creating a logical data volume in a consolidated storage array (CSA) which satisfies performance requirements for the logical data volume, the CSA comprising a plurality of storage arrays, each of the storage arrays having performance capabilities, the performance requirements for the logical data volume exceeding available performance capabilities of any single storage array, the CSA being connected to a host device executing data access software which uses the logical data volume, comprising the steps performed by the CSA of:

designating anyone of the plurality of storage arrays as a primary device of the CSA;

analyzing the storage arrays for their available performance capability in light of the performance requirements for the logical data volume;

selecting at least some of the storage arrays, a combined available performance capability of which is at least equal to the performance requirements for the logical data volume;

configuring the selected storage arrays for storage spaces for the logical data volume, the storage spaces of each selected storage array containing a portion of the logical data volume;

forming volume information describing the logical data volume;

sending the volume information from the CSA to the host device for configuring the data access software to access the logical data volume wherein the host device is a computing system capable of executing programmed instructions to perform the data access software where the data access software includes storage management processes or user application processes or both user application processes and storage management processes;

monitoring whether currently utilized performance capabilities of each of the storage arrays are within a predetermined range of maximum performance capabilities for the storage arrays; and adjusting at least a portion of the one of the storage spaces for the logical data volume to maintain the performance capabilities of each of the storage arrays within the predetermined range, wherein the method is performed by a controller within the primary device, and wherein any of the storage arrays may take over as the primary device in response to sensing a failure of the primary device.

2. A method as defined in claim 1 further comprising the steps of:

issuing a volume create command from the host device to the CSA to instruct the CSA to create the logical data volume in the storage arrays in the CSA;

receiving the volume information at the host device; and configuring the data access software with the volume information of the logical data volume enabling the host device to access the logical data volume.

3. A method as defined in claim 2 further comprising the step of:

specifying at least one of the bandwidth, transaction rate, redundancy or size of the logical data volume in parameters that describe the performance requirements for the logical data volume.

4. A method as defined in claim 2, wherein the data access software includes data striping software, further comprising the step of:

striping the logical data volume across the selected storage arrays.

5. A method as defined in claim 1 further comprising the steps of:

striping the logical data volume across the selected storage arrays; and describing, in the volume information, a striping definition for a manner in which the logical data volume is striped across the selected storage arrays.

6. A storage area network (SAN) having a host device connected to a consolidated storage array (CSA), the host device accessing data stored on the CSA and sending a volume create command to the CSA, the SAN comprising:

a plurality of storage arrays each having a plurality of storage devices containing the data, the storage arrays forming the CSA and each having available performance capabilities;

a logical data volume distributed across the storage arrays and contained on portions of the storage devices of the storage arrays, the logical data volume containing the data, the logical data volume having performance requirements that are higher than the available performance capabilities of each individual storage array before the logical data volume is created on the storage devices of the storage array; the performance requirements being specified by a user of the SAN and issued by the user through the host device to the CSA; and a CSA primary device designated by the CSA as any one of the storage arrays and connected to all other storage arrays and executing volume create software to create the logical data volume on the storage devices in the storage arrays in response to the volume create command sent by the host device, the volume create command including the performance requirements of the logical data volume, the CSA primary device further executing the volume create software to analyze the available performance capabilities of the storage arrays before the logical data volume is created on the storage devices in light of the performance requirements of the logical data volume, the CSA primary device further executing the volume create software to select the storage arrays for the portions of the storage devices to contain the logical data volume, combined performance capabilities of the selected storage arrays being at least equal to the performance requirements of the logical data volume, the CSA primary device further executing the volume create software to configure and distribute the logical data volume across the selected storage arrays, the CSA primary device further executing the volume create software to monitor whether the logical data volume is operating within the performance requirements, adjusting at least a portion of the one of the storage spaces for the logical data volume, and the CSA primary device further executing the volume create software to adjust the configuration of the logical data volume to maintain the performance requirements of the logical data volume, the CSA primary device further adapted to communicate information regarding the configuration of the logical data volume to the host device to configure data access software operable in the host device to use the logical data volume, and wherein the data access software in the host device includes storage management processes, user application processes or both storage management processes and user application processes, and wherein any of the other storage arrays may take over as the CSA primary device in response to sensing a failure of the presently designated CSA primary device.

7. A SAN as defined in claim 6 wherein:

the performance requirements of the logical data volume are specified by the user in the volume create command and include at least one of a bandwidth, transaction rate, redundancy or size of the logical data volume.

8. A SAN as defined in claim 6 wherein:

the logical data volume is striped across the selected storage arrays; and the volume information includes a striping definition for the logical data volume.

9. A method of creating a logical data volume in a storage area network having a host device and a consolidated storage array (CSA) including a plurality of storage arrays, comprising the steps of:

establishing parameters defining performance requirements of the logical data volume, the performance requirements exceeding available performance capabilities of any single storage array;

sending a volume create command containing the established parameters from the host device to the CSA instructing the CSA to create the logical data volume with the performance requirements;

designating any one of the plurality of storage arrays as a primary device of the CSA;

receiving at the host device volume information from the CSA indicating that the CSA has created the logical data volume, the volume information including a striping definition of the logical data volume which describes selected ones of the storage arrays and portions of the selected storage arrays in which the logical data volume is sniped across the CSA;

configuring a host-based striping software with the striping definition of the logical data volume to enable the host device to access the logical data volume wherein the host device is a computing system capable of executing programmed instructions to perform the striping software where the striping software includes storage management processes or user application processes or both user application processes and storage management processes;

monitoring whether currently utilized performance capabilities of each of the storage arrays are within a predetermined range of maximum performance capabilities for the storage arrays; and adjusting the configuration of the logical data volume to maintain the performance capabilities of each of the storage arrays within the predetermined range, wherein the method steps of designating, receiving and configuring are performed by a controller within the primary device, and wherein any of the storage arrays may take over as the primary device in response to sensing a failure of the primary device.

10. A method for managing data storage in a storage area network having a host device connected to a consolidated storage array (CSA), the CSA including a, plurality of storage arrays across which a logical data volume is stored on behalf of the host device, the logical data volume having performance requirements and the storage arrays having a maximum performance capability, comprising the steps performed by the CSA of:

monitoring for a data transfer performance parameter of each of the storage arrays on which a portion of the logical data volume is stored;

determining whether the data transfer performance parameter of each of the storage arrays on which a portion of the logical data volume is stored is within a predetermined range of the maximum performance capability for each of the storage arrays;

adjusting the configuration of the logical data volume to maintain the data transfer performance parameter of each of the storage arrays within the predetermined range; and communication volume information regarding the logical data volume to configure striping software operable on the host device wherein the striping software includes user application processes, storage management processes or both storage management processes and user application processes, wherein the method is performed within a designated one of any of the plurality of storage arrays, and wherein any of the storage arrays may take over as the primary device in response to sensing a failure of the primary device.

* * * * *